United States Patent
Uemura

(10) Patent No.: US 7,758,005 B2
(45) Date of Patent: Jul. 20, 2010

(54) FLAT DISPLAY ROTATION APPARATUS

(75) Inventor: Yasuyuki Uemura, Osaka-fu (JP)

(73) Assignee: Simontec Inc., Osaka-hu (JP)

( * ) Notice: Subject to any disclaimer, the term of this patent is extended or adjusted under 35 U.S.C. 154(b) by 597 days.

(21) Appl. No.: 11/730,238

(22) Filed: Mar. 30, 2007

(65) Prior Publication Data

US 2008/0134823 A1 Jun. 12, 2008

(30) Foreign Application Priority Data

Mar. 31, 2006 (JP) ............................. 2006-097470

(51) Int. Cl.
  A47B 91/00 (2006.01)
  A47B 95/00 (2006.01)
  A47G 29/00 (2006.01)
  B65D 19/00 (2006.01)
  G06F 1/16 (2006.01)
  H05K 5/00 (2006.01)
  H05K 7/00 (2006.01)

(52) U.S. Cl. ..................... 248/346.06; 248/346.01; 248/349.1; 248/130; 248/131; 361/679.02; 361/679.06

(58) Field of Classification Search ............ 248/346.06, 248/349.1, 124.1, 125.7, 125.1, 346.01, 131, 248/130, 919, 292.12, 183.4; 361/810, 807, 361/825, 755, 679.02, 679.05, 679.6, 681–682; 74/469, 473, 434; 475/4

See application file for complete search history.

(56) References Cited

U.S. PATENT DOCUMENTS

| 1,157,307 | A | * | 10/1915 | Henderson | .................... 475/4 |
| 3,813,491 | A | * | 5/1974 | Pennar | ....................... 348/827 |
| 5,749,556 | A | * | 5/1998 | Matsuoka et al. | ........ 248/349.1 |
| 2005/0194509 | A1 | * | 9/2005 | Tsai et al. | ................. 248/349.1 |
| 2006/0022108 | A1 | * | 2/2006 | Kuga | ........................... 248/422 |
| 2007/0007401 | A1 | * | 1/2007 | Corporation et al. | ...... 248/125.7 |
| 2008/0185484 | A9 | * | 8/2008 | Suzuki | .................... 248/125.7 |

* cited by examiner

Primary Examiner—J. Allen Shriver, II
Assistant Examiner—Christopher Garft
(74) Attorney, Agent, or Firm—Bacon & Thomas, PLLC

(57) ABSTRACT

A rotation apparatus of a flat display including a standard shaft which is implanted and fixed in the base, a clutch plate which is pivotally supported by the standard shaft so as to be able to freely rotate and is driven to rotate by rotation drive means as needed, a standard gear which is attached and fixed to the standard shaft, an idle gear which is attached to the clutch plate to be able to freely rotate and is engaged with the standard gear to roll around the standard gear, and a rotation output gear which is engaged with the idle gear and attached to the clutch plate to be able to freely rotate and orbit the circumference of the standard gear while rotating itself to support the flat display via the supporting shaft.

4 Claims, 4 Drawing Sheets

[FIG. 1]
(A)
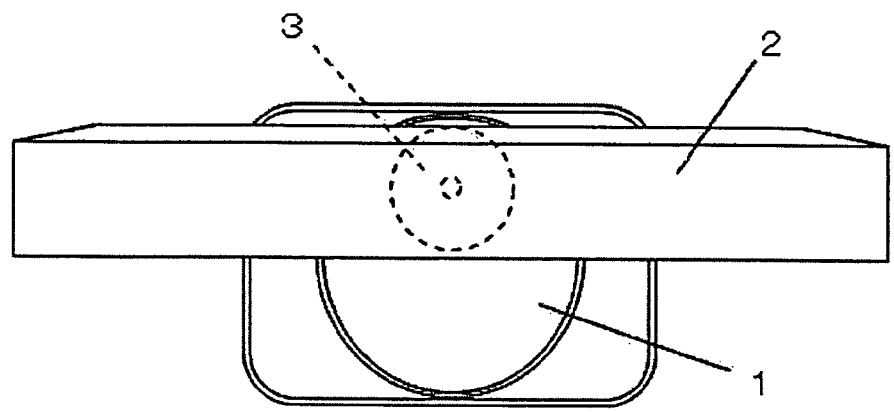
(B)
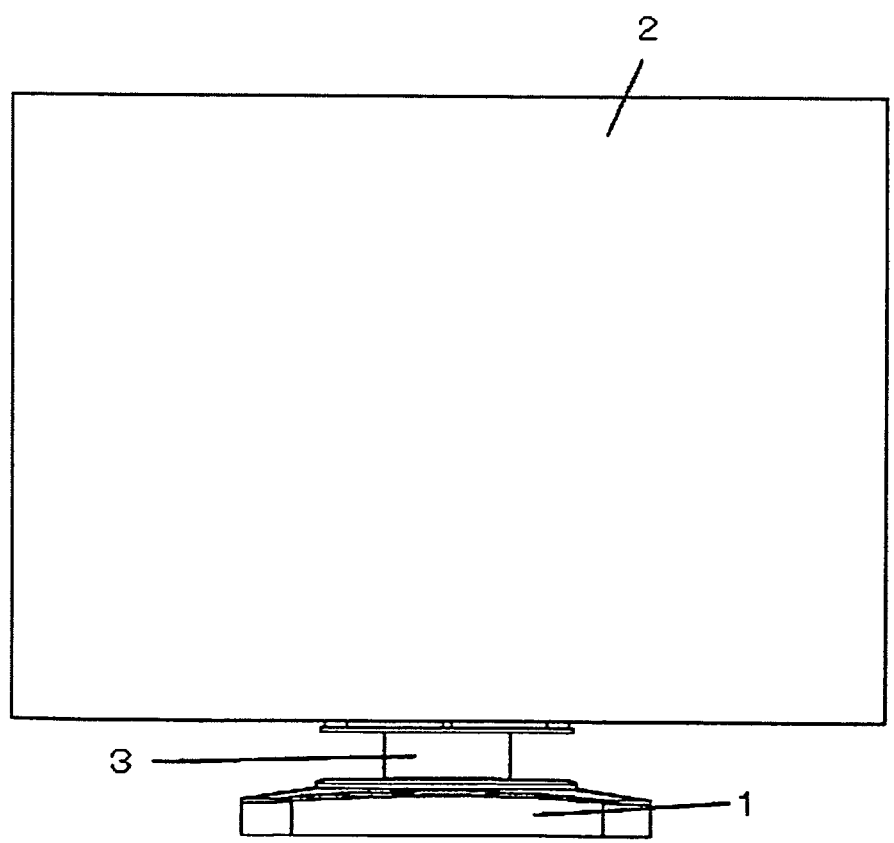

[FIG. 2]
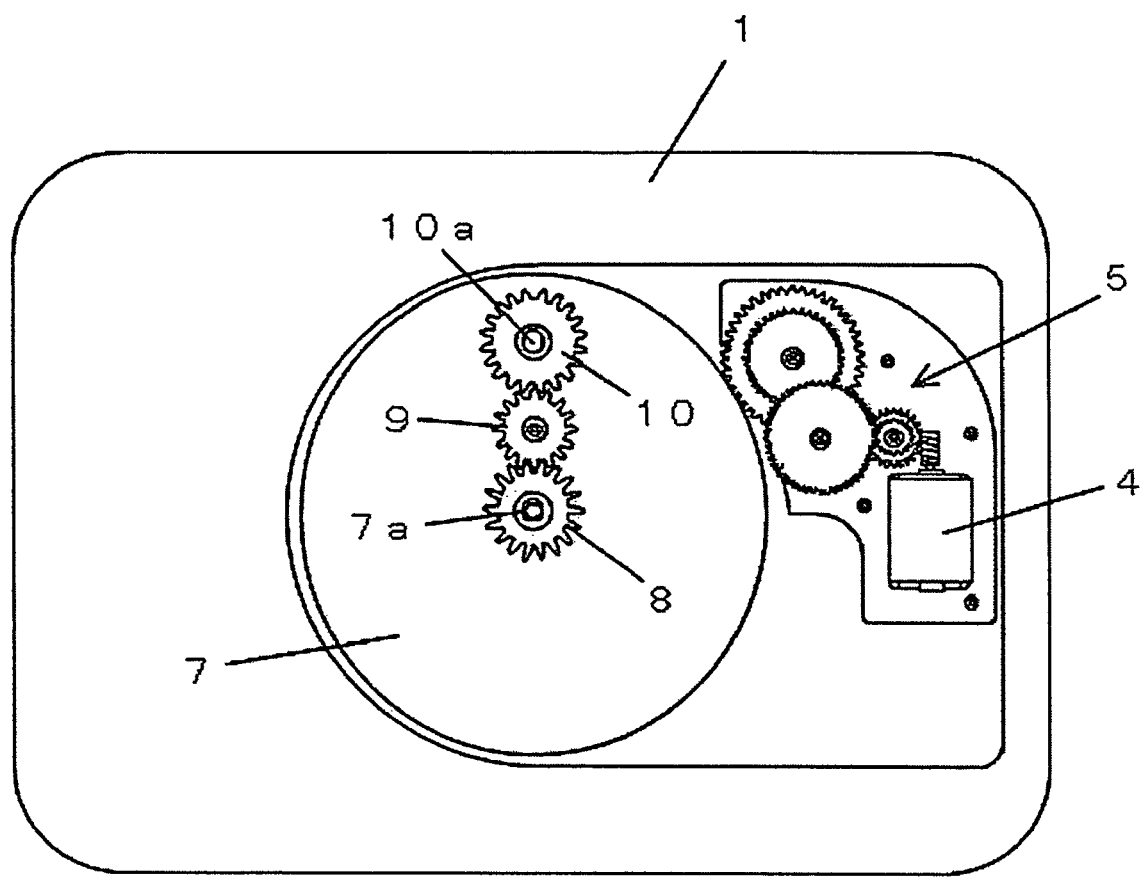

[FIG. 3]
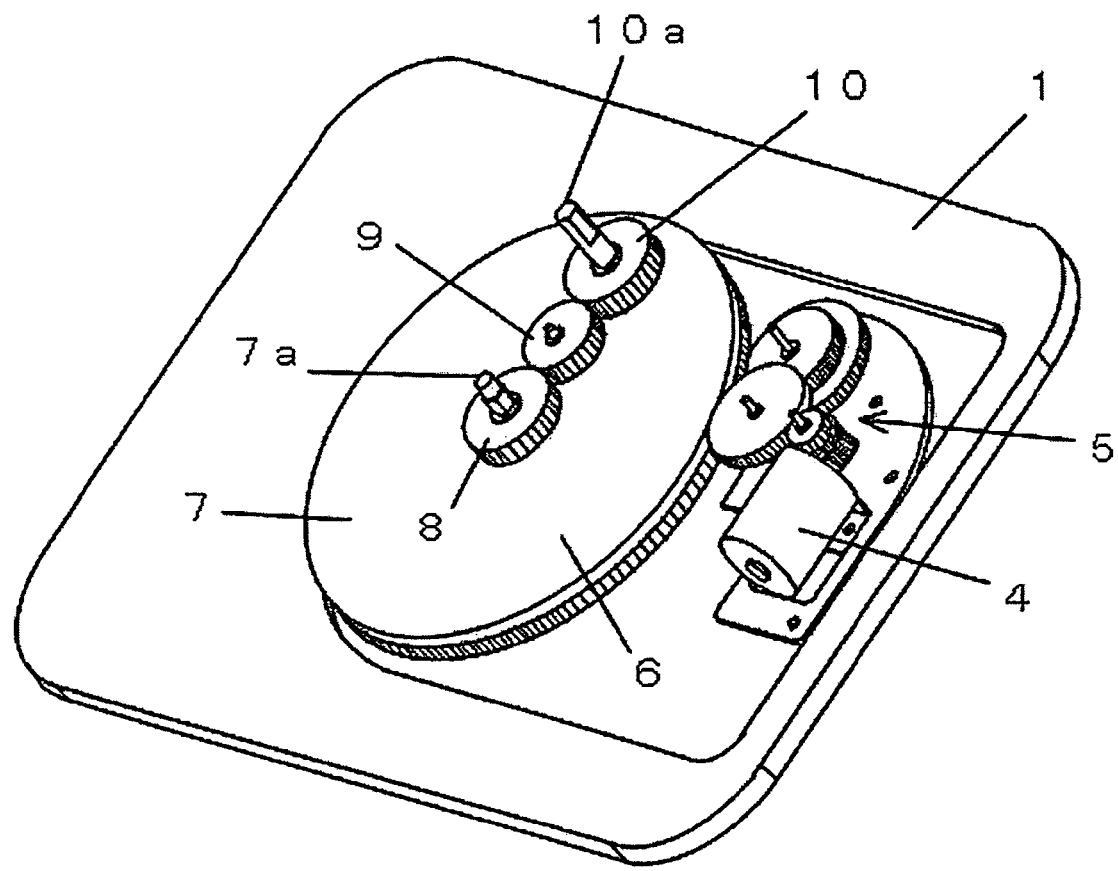

[FIG. 4]
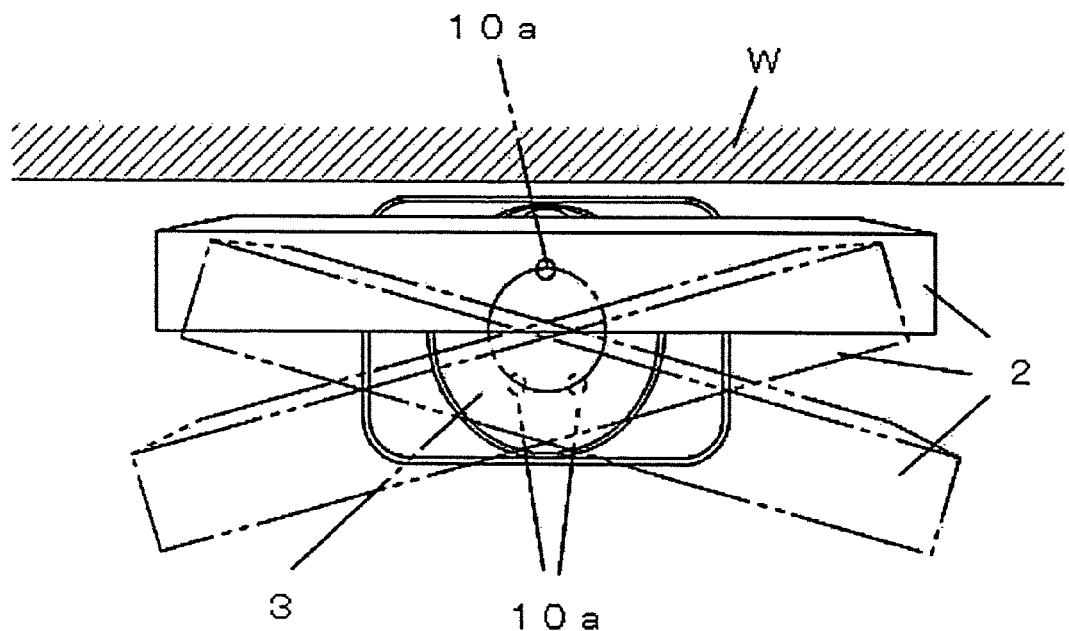
[FIG. 5]
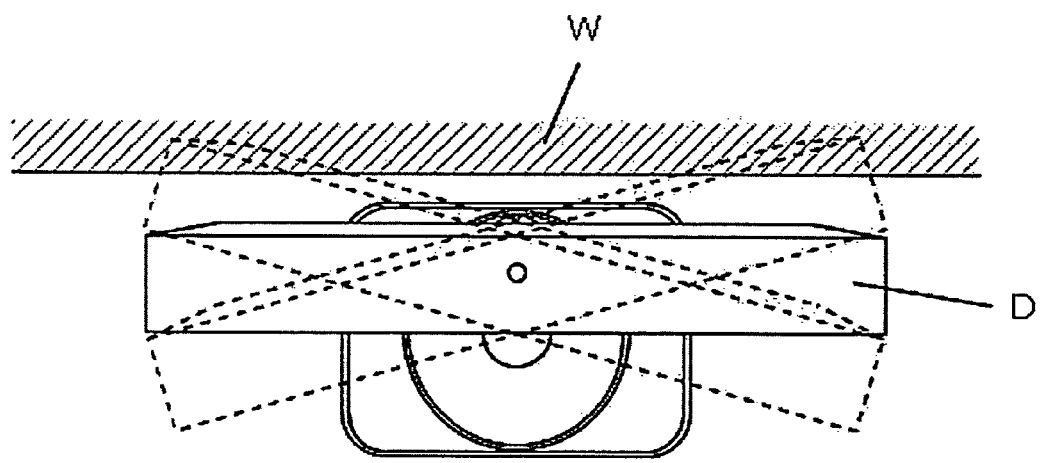

FLAT DISPLAY ROTATION APPARATUS

BACKGROUND OF THE INVENTION

1. Field of the Invention

The present invention relates to a rotation apparatus of a flat display such as a liquid crystal display or a plasma display.

2. Related Art

In case of a conventional rotation apparatus of a flat display, as shown in FIG. 5, when the display is rotated horizontally, end part of a flat display D comes into contact with a wall W behind the display. To avoid it, it is required to locate a base B to the viewer's side and this leads to narrowing a space in the room. Especially, this problem is becoming serious with regard to a large-size flat display.

As public documents regarding the conventional ones, following Patent References 1 and 2 can be listed.

[Patent Reference 1] Japanese Published Unexamined Patent Application No. 2004-258055

[Patent Reference 2] Japanese Published Unexamined Patent Application No. 2004-304679

A problem to be solved by the present invention is to provide a rotation apparatus of a flat display which prevents a large flat display from coming into contact with a wall surface even when it is brought near the wall surface so that the space of the room can be saved.

SUMMARY OF THE INVENTION

The rotation apparatus of a flat display of the present invention is a rotation apparatus which enables a flat display which is supported by a base through a supporting shaft to be rotated in horizontal directions and includes a standard shaft which is implanted and fixed in the base, a clutch plate which is pivotally supported by the standard shaft so as to be able to freely rotate and is driven to rotate by rotation drive means appropriately, a standard gear which is attached and fixed to the standard shaft, an idle gear which is attached to the clutch plate to be able to freely rotate and is engaged with the standard gear to roll around the standard gear, and a rotation output gear which is engaged with the idle gear and attached to the clutch plate to be able to freely rotate and orbit the circumference of the standard gear while rotating itself to retain the flat display via the supporting shaft. Moreover, the rotation drive means includes an electric motor and a train of gears for reducing speed which reduces output rotation of the electric motor. In addition, the clutch plate is mounted on an orbit output gear which is rotated by the rotation drive means in a friction contact state. Furthermore, difference of number of teeth between the standard gear and the rotation output gear can be changed.

The rotation apparatus of a flat display of the present invention has an advantage that a large flat display does not come into contact with a wall even when it is brought close to a wall surface and therefore space of a room can be saved.

BRIEF DESCRIPTION OF THE DRAWINGS

FIG. 1(A) is a plan view showing and (B) is an elevation view of an embodiment example of the apparatus of the present invention.

FIG. 2 is a plan view taken along i-i line of FIG. 1.

FIG. 3 is an explanatory view of FIG. 2.

FIG. 4 is a view showing the function of the apparatus of FIG. 1.

FIG. 5 is an explanatory view of a conventional apparatus.

DESCRIPTION OF THE PREFERRED EMBODIMENTS

FIG. 1 includes a plan view (A) and an elevation view (B) showing an embodiment example of an apparatus of the present invention and numeral 1 is a base, numeral 2 is a flat display supported by a supporting shaft 3 to be able to freely rotate.

FIGS. 2 and 3 show a rotation apparatus incorporated in the base 1, which includes an electric motor 4, a train of gears for reducing speed 5, an orbit output gear 6, a clutch plate 7, a standard shaft 7a, a standard gear 8, an idle gear 9, a rotation output gear 10, and an output shaft 10a.

Rotation of the electric motor 4 is significantly reduced by the train of gears for reducing speed 5 to drive rotation of the orbit output gear 6.

On the orbit output gear 6, the clutch plate 7 is mounted in a friction contact state and is rotated along with the rotation of the orbit output gear 6. When the clutch plate 7 is overloaded, it slips to cause the orbit output gear 6 rotate idly. Contact pressure of the friction contact may be adjusted as needed.

In the base 1, the standard shaft 7a is implanted to be fixed. The clutch plate 7 is pivotally supported by the standard shaft 7a so as to be able to freely rotate. To the standard shaft 7a, the standard gear 8 is attached and fixed. In the periphery of the standard gear 8, the idle gear 9 is engaged to rotate around the standard gear 8. The idle gear 9 is pivotally attached to the clutch plate 7 so as to be able to rotate freely.

Numeral 10 is the rotation output gear which is engaged with the idle gear 9 while being attached to the clutch plate 7 so as to be able to freely rotate. The rotation output gear 10 rotates itself while orbiting around the standard gear along with the rotation of the clutch plate 7. The rotation output gear 10 retains the flat display 2 via the supporting shaft 3.

Because the apparatus of the present invention is structured as above, when the clutch plate 7 is rotated, the output shaft 10a which is pivotally attached thereto so as to be able to rotate freely is rotated via the idle gear 9 and, at the same time, orbits around the standard gear 8 (standard shaft 7a). At this time, regardless of the number of teeth of the idle gear 9, rotation speed is determined by the difference of numbers of teeth of the standard gear 8 and the rotation output gear 10. For example, when the number of teeth of the standard gear 8 is 18 and that of the rotation output gear 10 is 20, when the rotation output gear 10 orbits once, the output shaft 10a rotates for an angle equivalent to two tooth of the rotation output gear 10. Thus, by changing the number of teeth of the standard gear 8 and the rotation output gear 10, rotation speed can be freely set.

FIG. 5 is for explaining the movement of the flat display 2 by the rotation apparatus. By the rotation of the rotation output gear 10, the flat display 2 is rotated and, at the same time, due to the orbit of the rotation output gear 10, the standard shaft 7a, that is, the center of the flat display 2, is moved forward. As a result, the flat display 2 is rotated while being moved forward as shown by wavy lines in FIG. 5, the end parts of the flat display 2 do not come into contact with the wall W.

The clutch plate 7 of the above embodiment is rotated by the orbit output gear 6 which is rotated by the electric motor 4 via the train of gears for reducing speed 5. However, the present invention is not limited thereto and any driving means, for example, manual means, can be used. Moreover, the rotation drive means of the present invention is not limited to the electric motor 4 and the train of gears for reducing speed 5.

LEGEND FOR REFERENCE NUMERALS 1 base
2 flat display
3 supporting shaft
4 electric motor
5 train of gears for reducing speed
6 orbit output gear
7 clutch plate
7a standard shaft
8 standard gear
9 idle gear
10a a output shaft
D flat display
W wall

What is claimed is:

1. A rotation apparatus of a flat display which enables a flat display which is supported by a base through a supporting shaft to rotate in horizontal directions comprising: a standard shaft which is implanted and fixed in the base, a clutch plate which is pivotally supported by the standard shaft so as to be able to freely rotate and is driven to rotate by rotation drive means as needed, a standard gear which is attached and fixed to the standard shaft, an idle gear which is attached to the clutch plate to be able to freely rotate and is engaged with the standard gear to roll around the standard gear, and a rotation output gear which is engaged with the idle gear and attached to the clutch plate to be able to freely rotate and orbit the circumference of the standard gear while rotating itself to support the flat display via the supporting shaft.

2. The rotation apparatus of a flat display according to claim 1, wherein the rotation drive means includes an electric motor and a train of gears for reducing output rotation thereof.

3. The rotation apparatus of a flat display according to claim 1, wherein the clutch plate is mounted on an orbit output gear which is rotated by the rotation drive means in a friction contact state.

4. The rotation apparatus of a flat display according to claim 1, wherein difference of numbers of teeth of the standard gear and the rotation output gear can be changed.

* * * * *